United States Patent [19]

Nassehi et al.

[11] Patent Number: 5,081,622
[45] Date of Patent: Jan. 14, 1992

[54] METHOD AND APPARATUS FOR DISTRIBUTED QUEUE MULTIPLE ACCESS IN A COMMUNICATION SYSTEM

[75] Inventors: Mehdi M. Nassehi, Adliswil; Johann R. Muller, Langnau; Erwin A. Zurfluh, Feldmeilen; Pitro A. Zafiropulo, Ruschlikon; Werner K. Bux, Richterswil, all of Switzerland

[73] Assignee: International Business Machines Corporation, Armonk, N.Y.

[21] Appl. No.: 485,394

[22] Filed: Feb. 26, 1990

[30] Foreign Application Priority Data

Mar. 23, 1989 [EP] European Pat. Off. ........ 89810229.8

[51] Int. Cl.$^5$ .............................. H04J 3/02; H04J 3/24
[52] U.S. Cl. .................................. 370/85.2; 370/85.1; 370/85.4; 370/85.6; 370/85.11; 370/94.1; 340/825.5
[58] Field of Search ............... 370/16, 67, 85.1, 85.2, 370/85.4, 85.6, 85.7, 85.9, 85.12, 85.15, 94.1, 85.11; 340/825.05, 825.5, 825.51

[56] References Cited

U.S. PATENT DOCUMENTS

| | | | |
|---|---|---|---|
| 4,161,786 | 7/1979 | Hopkins et al. | 370/85.2 |
| 4,210,780 | 7/1980 | Hopkins et al. | 370/85.2 |
| 4,313,196 | 1/1982 | Oblonsky | 370/85.6 |
| 4,510,599 | 4/1985 | Ulug | 370/85.6 |
| 4,730,307 | 3/1988 | Hughes et al. | 370/85.1 |
| 4,849,965 | 7/1989 | Chomel et al. | 370/85.1 |
| 4,922,244 | 5/1990 | Hullett et al. | 370/85.1 |
| 4,977,557 | 12/1990 | Phung et al. | 370/94.1 |
| 5,001,707 | 3/1991 | Kositpaiboon et al. | 370/94.1 |

FOREIGN PATENT DOCUMENTS 1158739 12/1983 Canada.

OTHER PUBLICATIONS

IEEE Proposed Standard: DQDB Metropolitan Area Network, Aug. 7, 1989, pp. 23-25.
IEEE Communications Magazine, vol. 26, No. 4, Apr. 1988, pp. 20-28, R. M. Newman et al.: "The QPSX Man".

Primary Examiner—Benedict V. Safourek
Assistant Examiner—Alpus H. Hsu
Attorney, Agent, or Firm—Joscelyn G. Cockburn

[57] ABSTRACT

A distributed queue multiple access technique is disclosed for a system comprising two counterflowing transmission busses (A,B), plural stations (i, j) connected between them, and a headend station generating slots on the first one (A) of the busses; each station transmitting access requests on the second one (B) of the busses and determining its right to transmit data in slots on the first bus on the basis of access requests it has seen. Each station maintains a FIFO queue (41) for sequential storage of numbers representing external (EXT-REQ) and local (LOC-REQ) access requests. To achieve correct timing between access requests entering the queue from the second bus and respective free slots passing a station on the first bus, a station-individual delay is introduced by maintaining in a FIFO delay storage (71) a specific number of entries. This results in an equally fair treatment for all stations, and guarantees the availability of consecutive free slots for any station which requested them.

23 Claims, 8 Drawing Sheets

FIG. 1A DUAL BUS CONFIGURATION
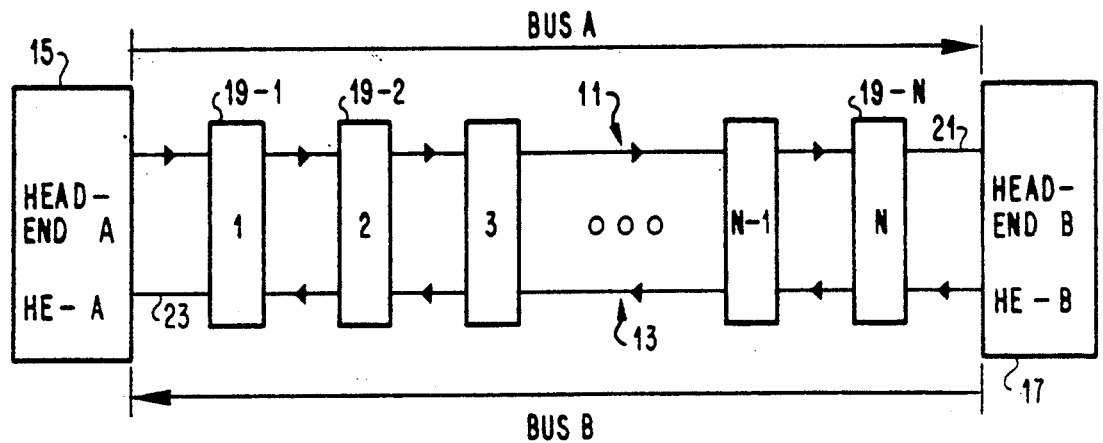
FIG. 1B FOLDED BUS CONFIGURATION
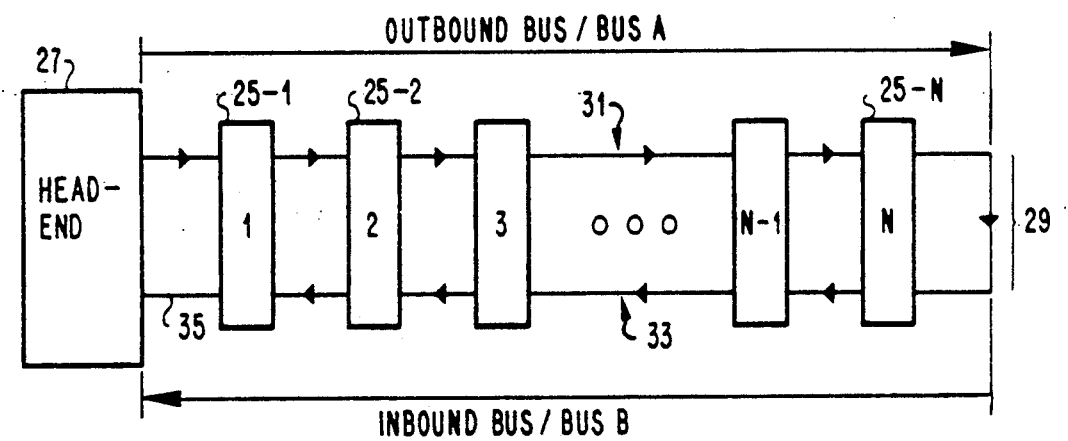

FIG. 2A CYCLE FRAME
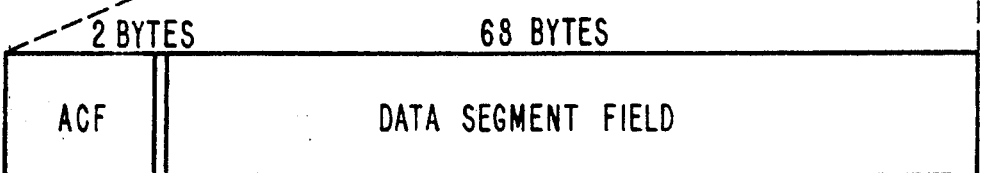
FIG. 2B SLOT FORMAT
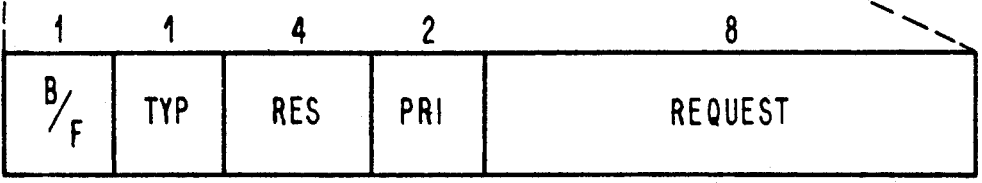
FIG. 2C ACCESS CONTROL FIELD ACF
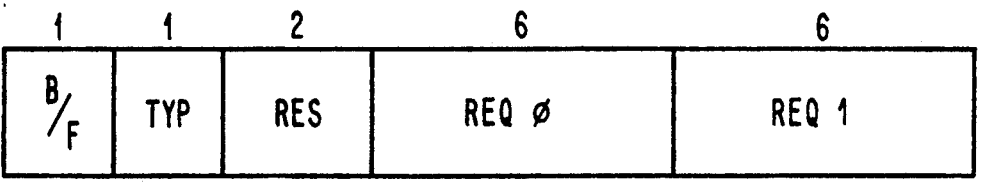
FIG. 2D ACF WITH MULTIPLE REQUEST FIELDS

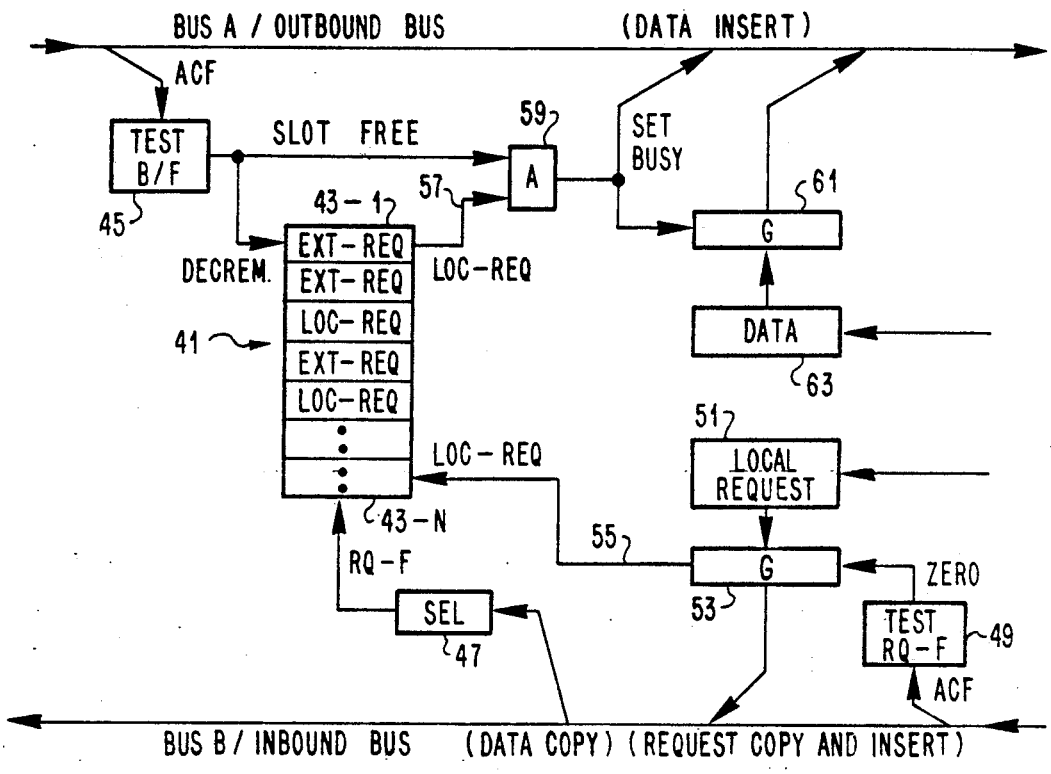
FIG. 3 BASIC FIFO REQUEST QUEUE
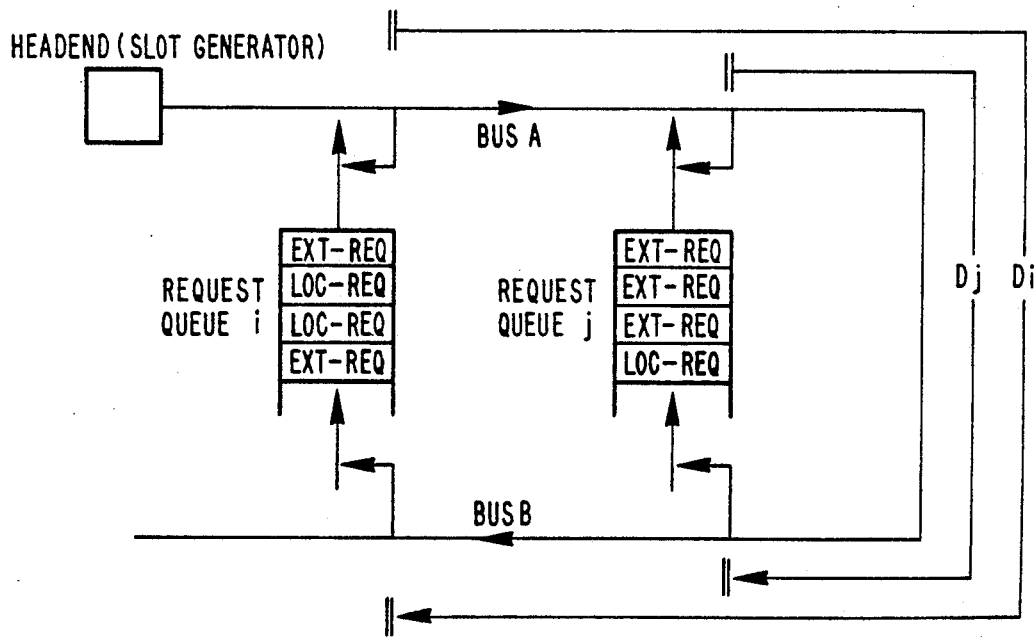
FIG. 4 PLURAL STATION FIFO QUEUES FIG. 5 REQUEST QUEUE WITH DELAY
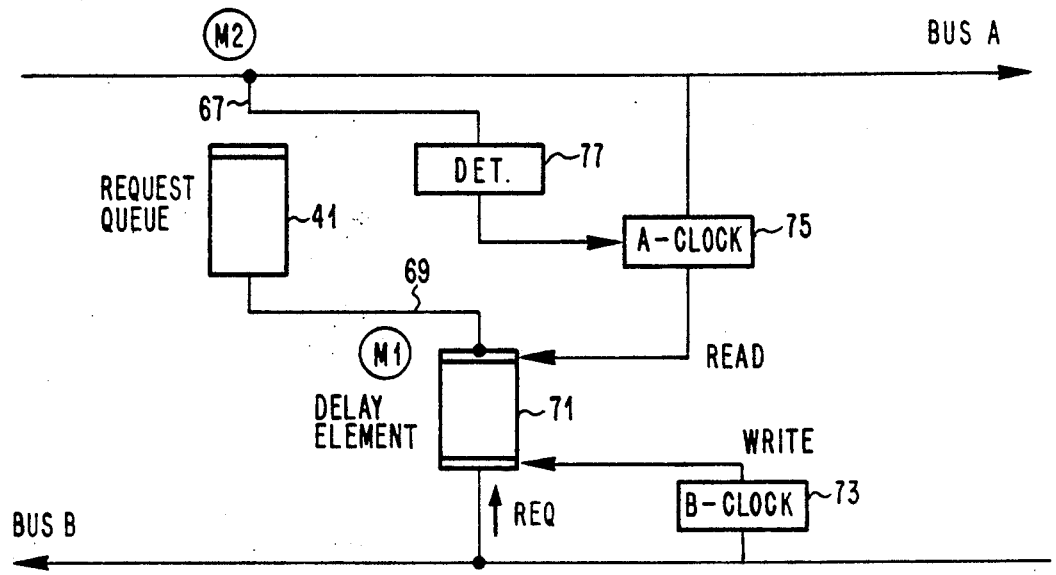
FIG. 6 PLURAL STATION FIFO QUEUES WITH DELAY
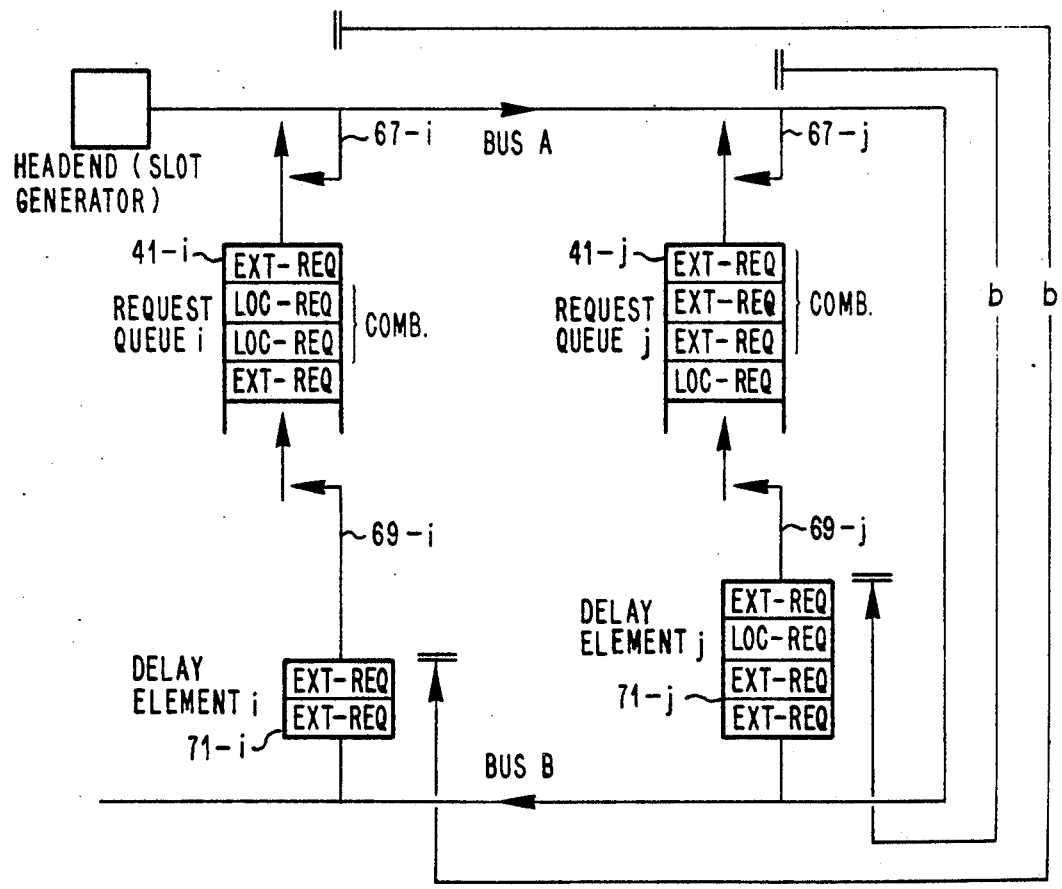

FIG. 8 BUS A CONTROLLER
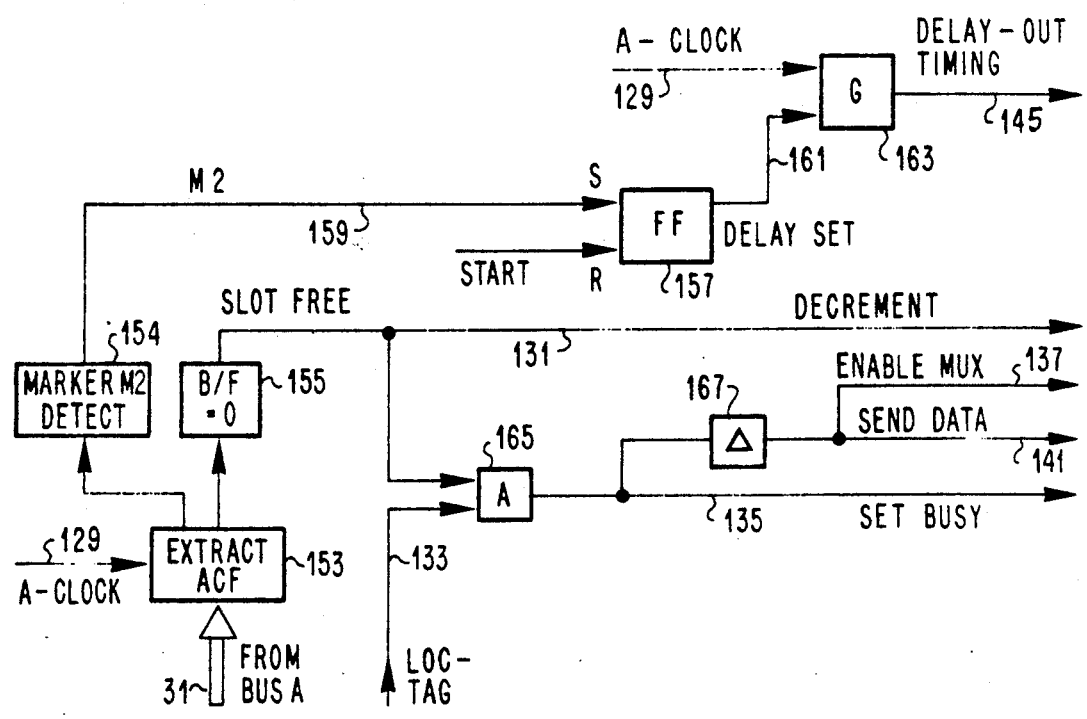
FIG. 9 BUS B CONTROLLER
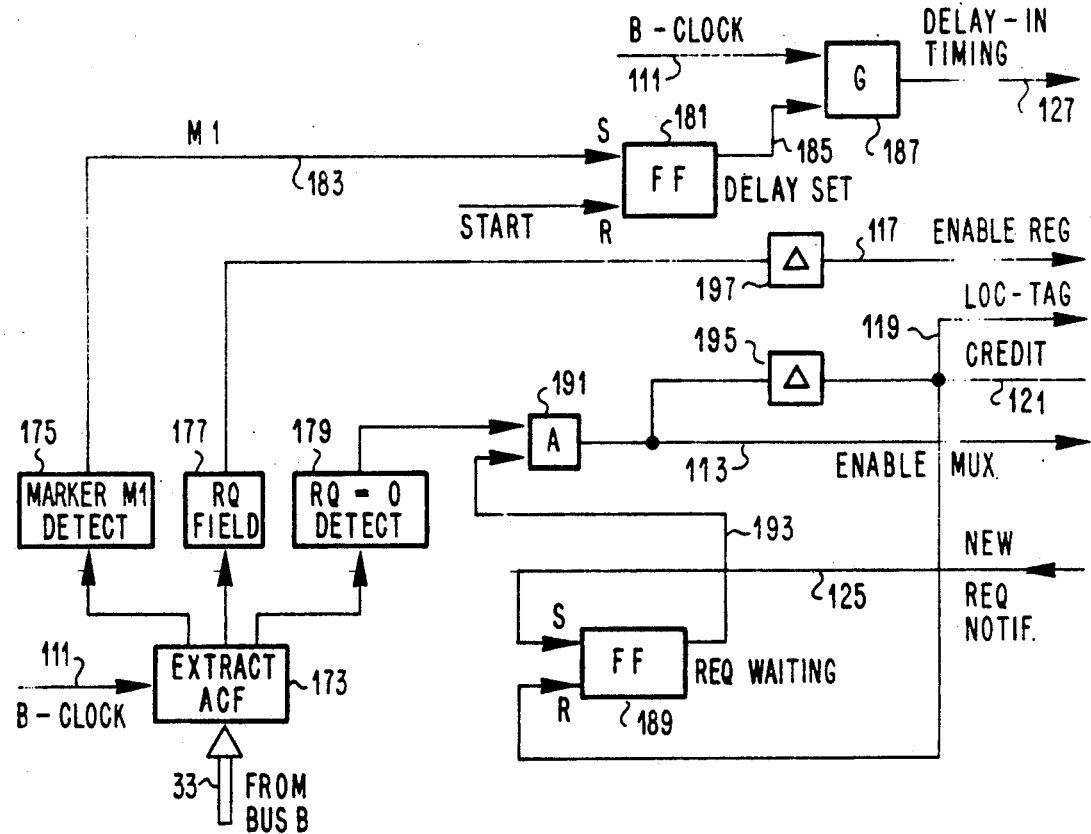

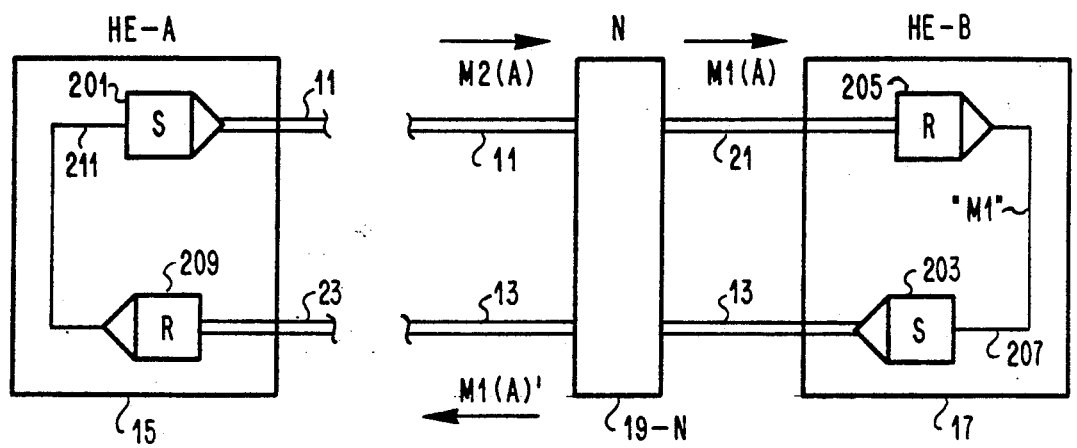
FIG. 10 WRAP-AROUND IN DUAL BUS SYSTEM
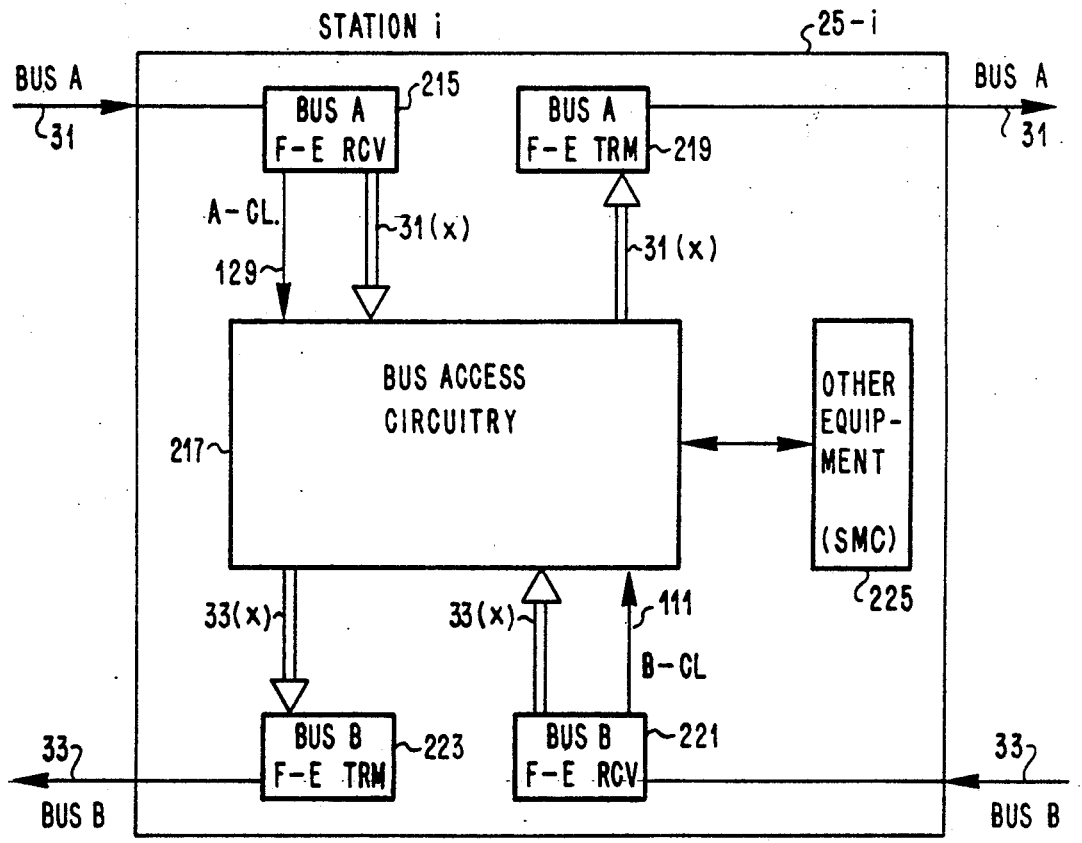
FIG. 11 SIGNAL CONVERSION BETWEEN BUS AND STATION (NODE)

METHOD AND APPARATUS FOR DISTRIBUTED QUEUE MULTIPLE ACCESS IN A COMMUNICATION SYSTEM

FIELD OF INVENTION

Present invention is concerned with access to the transmission medium in a communication network comprising two busses and a plurality of stations connected between them, and in particular to a method and apparatus for regulating access to the transmission medium on the basis of distributed request queues.

BACKGROUND

Several kinds of networks are known in which plural nodes or stations gain access to a common transmission medium. Examples of such systems are single bus networks with collision detection, and token ring networks as well as token passing bus networks. Recently, networks providing another technique of multiple access to a common transmission medium have become of interest. These are systems comprising two parallel busses with counterflowing transmission of information on the two busses. Slots are released at regular intervals by headend stations, and these slots are used by the node stations for data transmission. Each node station has to request access to a slot by previously transmitting an access request in an Access Control Field of a passing slot. It keeps a count of access requests it has seen from other stations (located upstream in request transmission direction) before it raises its own access request, and lets as many free slots pass by (for use by the other stations) as the count indicated, before it occupies the next free slot for transmission of its own data.

Such systems were described e.g. in a paper by R. M. Newman et al. entitled "The QPSX MAN", published in the IEEE Communications Magazine, Vol. 26 No. 4 (April 1988) pp. 20-28; and in a Draft Proposed IEEE Standard 802.6 entitled "Distributed Queue Dual Bus (DQDB) Metropolitan Area Network (MAN)", Draft D6, Nov. 15, 1988.

Though these known distributed queueing systems are well suited for networks comprising a limited number of stations, they have some disadvantages which become unacceptable and may render the system inefficient when the number of stations is raised to several hundred, and when the length of the transmission busses is in the order of several kilometers.

These disadvantages are in particular: An "unfairness" for some stations with respect to others, due to the fact that each station has to await a free access request field before it can transmit a request, so that stations located upstream (in request transmission direction) are preferred; and an impossibility to guarantee the availability of a sequence of consecutive slots for one station desiring to transmit the portions of a data packet without interruption.

OBJECTS OF THE INVENTION

It is an object of the invention to provide, in a system with two busses and distributed request queueing, an access technique which eliminates unfairness between stations.

It is another object of the invention to guarantee in a distributed request queueing communication system the availability of a sequence of consecutive free transmission slots for a station which previously requested at one time the respective number of slots.

SUMMARY OF THE INVENTION

These objects are achieved by the method and apparatus of the invention which provide, in a distributed queueing system, the ability to request multiple slots at a time, and the storage of external requests seen from other stations together with local requests, both in the form of request counts, in a single sequential request queue (FIFO type storage). They provide further an individual delay for request counts entering the request queue in a station, in such a way that the influence of different propagation times as seen for the different stations along the busses is eliminated (which would otherwise result in an inconsistency between the distributed request queues so that the stations would behave differently with respect to any particular slot propagating along a bus).

The invention ensures, even for a large number of stations and in a very long bus network, fairness among stations, i.e. giving each station equal chances for obtaining access to the transmission medium for data transfers. It further guarantees that when a station requested, by a single request, a plurality of slots, it will see an uninterrupted sequence of free slots as requested once it started transmitting, so that the necessity for numbering the different segments of one data packet and for providing housekeeping procedures to reassemble them (because they may not arrive consecutively at their destination) is eliminated.

These and other advantages will become more apparent from the following description and illustrative drawings of a preferred embodiment of the invention.

LIST OF DRAWINGS

FIG. 1A is a schematic representation of a dual bus system in which the invention can be used;

FIG. 1B is a schematic representation of a folded bus system in which the invention can be used;

FIGS. 2A-2D show the representation of data on the busses, in particular a cycle frame (2A) including several slots, a slot (2B) with its various fields, and and two forms of an access control field of a slot (2C, 2D);

FIG. 3 shows the request queue storage of a station according to the invention, plus related circuitry;

Figure 7A:
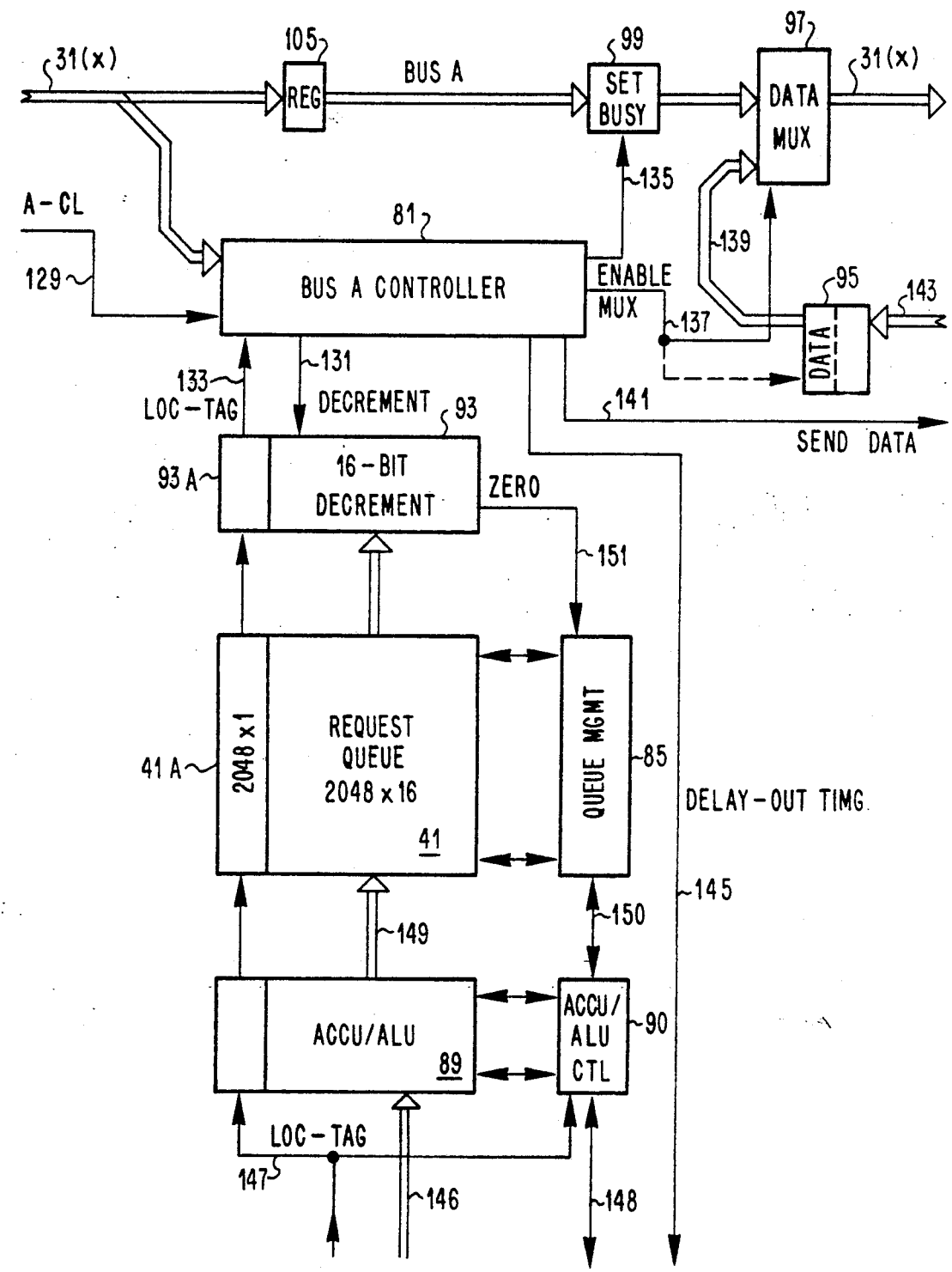
Figure 7B:
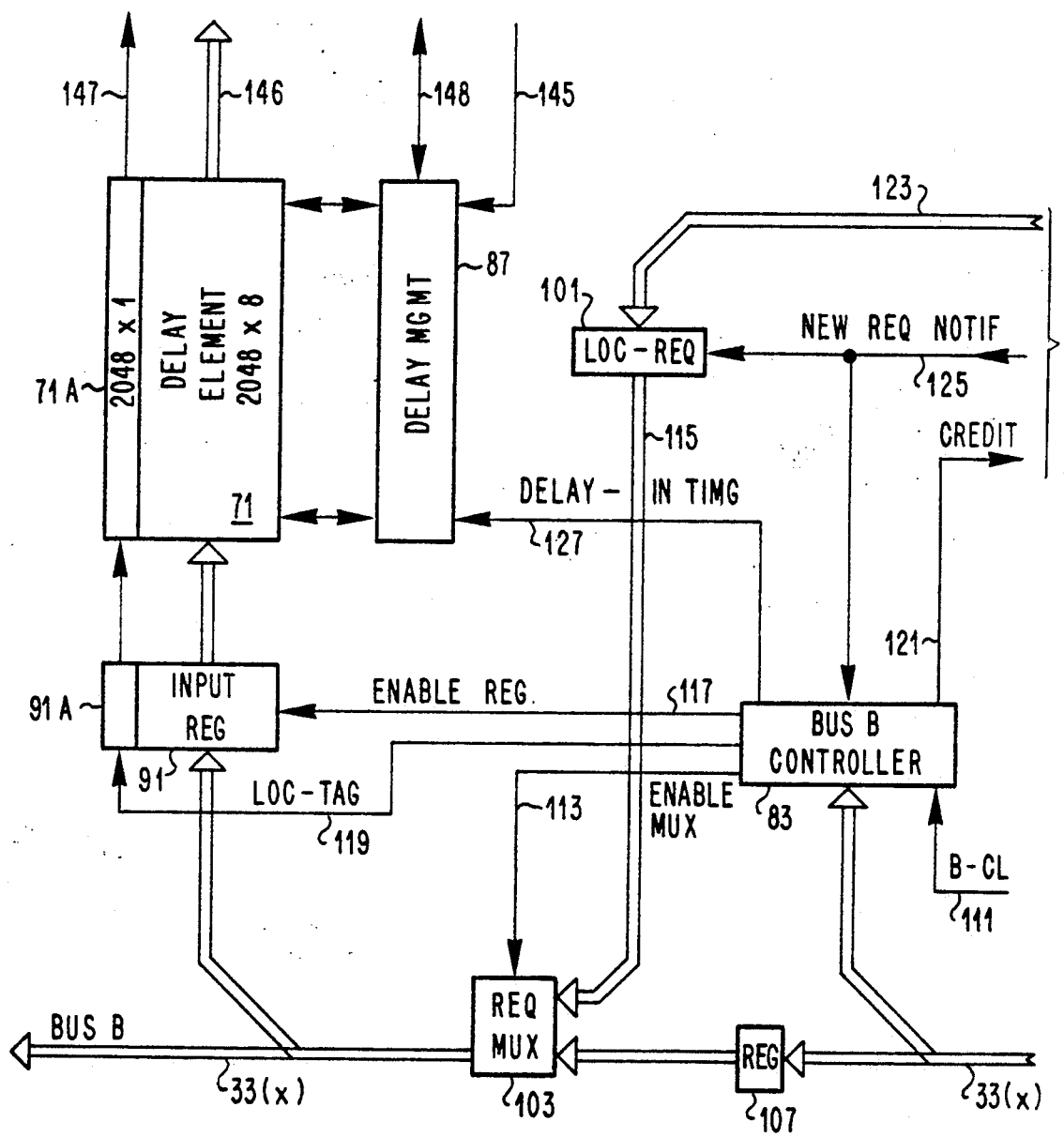

FIG. 4 schematically shows the request queues of two stations, and illustrates the propagation time differences for the requests before they enter the request queues;

FIG. 5 shows the request queue of a station in connection with a delay element according to the invention, FIG. 6 schematically shows the request queues and their associated delay elements, in two stations, FIGS. 7A and 7B are block diagram of a station's request queue and bus access circuitry, embodying the invention;

FIG. 8 is a block diagram of one bus controller of the circuitry of FIG. 7;

FIG. 9 is a block diagram of another bus controller of the circuitry of FIG. 7;

FIG. 10 shows the wrap-around modifications for a dual bus system which enable the initialization of individual delays in the stations by the transmission of special markers, and FIG. 11 is a block diagram of front-end circuitry interconnecting each station with the two busses, including signal conversion and clock signal derivation.

DETAILED DESCRIPTION

1) Environment System (Basic Network)

FIG. 1A and 1B show two forms of a communication network in which present invention finds application. Both networks consist of two busses (or bus segments) with a number of stations (nodes) connected between the two busses. Information on each bus is flowing in one direction only, and on the two busses it is counterflowing (antiparallel).

The network of FIG. 1A referred to as dual bus configuration comprises two separate busses A (11) and B (13). A headend station is connected to each bus, i.e. headend station HE-A (15) to bus A and headend station HE-B (17) to bus B. Each headend station releases time slots (explained below) for use by the node stations (19-1, 19-2, ..., 19-N) along the bus for data transmission. A special request technique, "distributed queueing", is used for regulating access by the stations to slots on the bus. The dual bus system and the access technique (which will be briefly reviewed in the sequel) were described in the paper and in the standards proposal already mentioned above in the introduction.

Each bus could end at the node station remote from the associated headend station, without being connected to the other headend station. However, some connection from the last node station (e.g. N) to the other headend station (e.g. HE-B) shown as line without arrow (21, 23) can be provided for special purposes.

The network shown in FIG. 1B referred to as folded bus configuration consists essentially of plural node stations (25-1, 25-2, ..., 25-N), a single headend station (27) and a folded bus comprising two bus segments called bus A and bus B, or outbound bus (31) and inbound bus (33), respectively. A fold connection (29) is provided at the last station N for interconnecting the two bus segments. The headend station is connected to both bus segments for releasing time slots to the outbound bus (A) and receiving returning time slots on the inbound bus (B). (In principle, the connection of the inbound bus from the first station back to the headend station, designated as 35 in the drawing, could be omitted in a normal folded bus system but here it is assumed that such connection exists). As in the dual bus network of FIG. 1A, information on the two bus segments is counterflowing. The same access mechanism (distributed queueing) can thus also be used on this folded bus system.

For the ease of description, the term "bus" is used in the following for each of the two separate busses of a dual bus system as well as for each of the two bus segments of a folded bus system.

In the following, the invention will be explained only in connection with a folded bus system as shown in FIG. 1B, to avoid any complication in the description due to the fact that everything is duplicated on the dual bus system of FIG. 1A (requests on bus A for access to bus B, and requests on bus B for access to bus A). It should be noted however that the invention is also well suited for such dual bus systems, and any modifications necessary will be explained at the end of the specification.

Frame/Slot Structure:

FIGS. 2A ... 2D show the structure of the information on the busses. The basic unit is the slot. Each headend station generates such slots which are of fixed length, at regular intervals. For synchronization and control purposes, a cycle frame may be defined as shown in FIG. 2A. The beginning of the cycle frame is a cycle frame header which contains information on synchronization, overall control, configuration, etc. The header is followed by consecutive slots.

The slot format can be seen in FIG. 2B. Each slot has an Access Control Field (ACF) for control information, and a data segment field for carrying the data to be transmitted. Of course, the data segment contents may also be subdivided into a header portion and a data payload portion. As such subdivision is not relevant for present invention, the data segment will be considered as an entity in the following description. A typical size of a slot is e.g. 70 bytes; two bytes for the ACF and the remaining 68 bytes for the data segment field. This can of course be selected according to the requirements of the respective system.

The access control field is shown in more detail in FIG. 2C. As mentioned above, in a typical example it comprises 2 bytes or 16 bits. The first field carries the Busy/Free (B/F) bit indicating whether the data segment actually contains data or not. A station can access a slot for data transmission only if this bit indicates that the slot is still empty. The next field carries a Type (TYP) bit which indicates to which of two different categories (e.g. arbitrated or non-arbitrated) the slot belongs. The next field (PRI) comprises two bits indicating the priority to which the slot belongs. It is assumed for the system to be described as embodiment of the invention that four priority categories are provided which can be distinguished by these two bits. A Reserved (RES) field comprises four bits which are not utilized in the main example to be described and can be assigned to any purpose by the system designer. (The possibility to transfer special markers in this field is mentioned in section 7 below). The REQUEST FIELD comprises eight bits to be used for access requests. In the present case, this field can contain a request count for up to 256 slots. It is assumed here that per ACF, a request can be made only for one priority category, as determined by the two bits in the Priority field. The headend station sets the value in the Priority field cyclically to one of the four categories such that in the total sequence of slots on the busses, one quarter is associated with each one of the priorities.

Any other format of the ACF can of course be chosen. As one alternative, FIG. 2D shows an ACF for a two-priority system. The first ACF bit again indicates the Busy/Free status, the second bit determines the slot Type. Two additional bits are Reserved. The remaining 12 bits are subdivided into two request fields (REQ 0, REQ 1), each for one of the two priorities considered. Thus, each field can accomodate a six-bit request count so that for each priority a request for up to 64 slots can be made. For the following description, the ACF format of FIG. 2C is assumed.

2) Essentials of Prior Art and Invention

Before explaining the invention, the state of the art of dual bus systems with distributed queueing access will be briefly reviewed. Such known systems are described e.g. in the publications already mentioned in the introduction.

In the known systems, the ACF comprises four one-bit request fields, each for one priority. Thus, a request for a single slot can be made per priority in each ACF. A station requiring access to a slot (in a given priority class) waits for a free request field in that priority, and inverts the respective bit to indicate its access request to the other stations. It keeps a count of access requests it has seen from other stations before making its own request, and lets as many free slots pass for the other stations as it had seen external access requests prior to its own, so that they can be correctly served. Only then, it accesses the next free slot passing its access point. In the meantime, it has again counted the external access requests seen from other stations, and keeps on accumulating these external access requests until it places its own next request.

This procedure has several disadvantages.

1) Only one slot can be requested at a time.

2) The next access request can only be made if the previous one has been served (i.e. there must not be more than one pending access request in any station).

3) A local request is registered in the station's request queue (actually by transferring the external request count from one counter to another) as soon as the local request is generated in that station. However, there may elapse a considerable time interval before that station can enter its local request into a passing slot (if a free request subfield does not appear for some time because of high activity of other stations). This results in an inconsistency between the queues of different stations.

4) Due to different propagation times (delay) of the ACF fields with the requests in one direction and of the free slots for data transmission in the other direction, there may be discrepancies between the time when a local request comes up to the top of the waiting queue (i.e. when all external request which were older than the local request have been served in the opinion of the respective station), and when the "corresponding" free slot arrives at the station's access point. In other words, in certain situations a station P may grab away a free slot which actually was reserved for a station Q, because the station P believed that it was now its turn to access a slot for data transmission.

The facts of points 1, 2, and 3 above cause "unfairness" in the system, i.e. the node stations have unequal chances or different probabilities to access a free slot for data transmission.

The facts mentioned in point 4 above prevent the possibility to guarantee to any station the availability of a sequence of consecutive slots which is often desirable to enable continuous transmission of a larger data packet. Even if multiple slot reservations were allowed at one time, the availability of a string of consecutive free slots could not be guaranteed to a station having made the correct reservations, because of the facts mentioned above. As a result, the system must provide for the segmentation of larger data packets into slot-size segments that can be transmitted independently; this necessarily results in increased overhead, i.e. additional administrative steps and data transmissions for segmenting and reassembling the data packets.

The invention avoids these disadvantages by the following features:

a) The reservation of multiple slots at a time is enabled by providing count fields for reservation.

b) Further requests can be made by a station even if a pending request was not yet served. Thus, a plurality of pending requests each for multiple slots are enabled. (However, an upper limit or request window size may still be set by the system.)

c) A local request is only entered into a station's request queue after this request has been actually transmitted in the request subfield of a passing slot.

d) Both, the external requests seen by a station and the own local requests, are stored in a single sequential queue clearly indicating the sequence of the requests (and their temporal relationship).

e) A selective delay is introduced to eliminate the influence of the different propagation times for requests and free slots on the two busses as seen for different stations.

These measures guarantee that all stations independent of their location along the busses are treated equally fair, and that the access to a consecutive sequence of requested slots can be guaranteed for each station, thus eliminating the complexity of data packet segmentation and reassembly.

The various features of the invention are explained generally in the following section. Later, an actual implementation will be described.

3) Details of Inventive Features

Some essential features of present invention will now be explained with reference to FIG. 2C and FIGS. 3–6.

In FIG. 2C (and 2D) it has already been shown that request fields are provided which can each accomodate a request count, i.e. a number representing a multiple request for a plurality of (consecutive) slots.

FIG. 3 is a block diagram of a request queue in the form of a FIFO (First-In First-Out) storage, and its related elements in a station. This block diagram contains only the features necessary for describing some of the basic inventive functions; a more complete description is given later in connection with FIG. 7.

The request queue FIFO storage is schematically shown at 41. It comprises sequential storage positions 43-1 to 43-N each for holding either an external request count EXT-REQ or a local request count LOC-REQ, both representing a number as can be held in the request field of a slot's ACF, plus an indication whether the request is external or local. The contents of the top position (43-1) can be decreased by one unit when a passing empty slot is detected on bus A by detecting means 45 (TEST B/F).

The contents of each request field (RQ-F) of passing slots are extracted by selection means 47 (SEL) and inserted into the bottom position 43-N of the FIFO storage as request count. If it was detected by detecting means 49 (TEST RQ-F) that the external request count arriving in a slot on bus B is zero, then a local request waiting in a buffer 51 is gated through gate 53 into the empty request subfield of the passing slot on bus B as local request count. Simultaneously a LOC-REQ indication is sent on line 55 to the FIFO request queue entry to mark the value just being inserted into the FIFO request queue as local request count. Thus, the request queue in FIFO 41 contains all the access request counts as seen by the respective station or generated by itself, in the correct sequential order.

Whenever an empty slot is detected on bus A, the existing count in the top position is decremented by one. If the count is for an external request, the free slot is not accessed but left free for another station downstream. When the top position has reached count zero, then the next position becomes the top position. If there is a count in the top position which represents a local request, as will be indicated on line 57 (LOC-REQ), then a signal is furnished through AND gate 59 as "set busy" signal to the bus and as release signal to gating means 61 which will then gate the data waiting in buffer 63 into the data segment field of the passing slot on bus A. This will continue until the local request count in the top position has reached the value zero. Of course, instead of having a separate FIFO storage, the request queue can be implemented in a RAM store with pointers. The various gating and control means can also be implemented in different ways.

It should be noted that in this configuration, access requests are inserted on and copied from bus B, whereas data are inserted on bus A but copied from bus B.

FIG. 4 illustrates the situation for the queues in two selected stations i and j. Though the queues have different contents, they correctly reflect the access situation for each individual station. As is also already indicated in FIG. 4, the propagation delay for any slot from the bus A access point of station i to its entry point into the FIFO queue is different from the propagation delay for station j ($Di \neq Dj$). This will result in the fact that when any single slot request which was inserted into both queues reaches the top position of the queue e.g. in station i, this station may see passing on bus A another slot than station j sees when the corresponding single slot request reaches the request queue top position in that station.

The elimination of this difference is one feature of the invention and will now be explained with reference to FIG. 5. In each station, in addition to the FIFO request queue 41, there is provided a delay element 71, by which a selective delay which is individual to the respective station can be introduced. The delay is so selected (as will be explained in the sequel) that the propagation time of a slot from the bus A access point (67) to the entry (69) of the FIFO request queue is equal for all stations of the system. Principles of the operation of the delay means are illustrated in FIG. 5. The request counts REQ (external or local) are entered from bus B into the delay element 71. In a preferred embodiment, the delay element 71 is also operated as a FIFO storage. The writing of request counts into the delay element is controlled by a timing signal derived (73) from the signals (slots) on bus B. The delay of the element 71, once it has been selected, stays constant. Request counts reaching the top of the delay element are read out under control of a timing signal derived (75) from the signals (slots) on bus A, and then inserted into the bottom position of the FIFO request queue 41. Thus, the access request counts are entered into and removed from the delay element at the pace of the slots on bus B and bus A, resepctively.

Initialization of the selective delay in each station is done as follows: The headend station inserts into a generated slot a first particular initialization marker M1 which propagates over the A bus and then the B bus to all stations. In each station recognizing the M1 marker, the B-clock timing signal for writing into the delay element 71 is started, and the request field contents of the slot carrying the M1 marker is inserted into the empty delay element 71, i.e. into its top position. The A-clock timing signal is inhibited during the initialization so that this first request count stays in the top position of the FIFO storage (delay element). Request counts of subsequent slots are written into the delay element which thus accumulates a number of such request counts (but all being zero). After a preselected time interval b corresponding to the system latency normalized to the slot transmission time (total propagation time, which depends on bus propagation speed, number of stations, etc.) the headend station inserts another particular initialization marker M2 into a generated slot which it releases on bus A. When this slot reaches the access point 67 of a station, it is detected by means 77 which then enable the A-clock timing signal (75) for reading out the count value in the top position of the delay element (FIFO) and transferring it into the FIFO request queue 41. The delay of element 71 (i.e. the number of request counts stored therein) now remains fixed. It is important that for each slot passing on bus B, a count is inserted into the delay element, even if it is zero, to thereby keep the number of request counts in the delay element and thus its delay constant.

It is further important that the propagation time on the two busses between points 67 and 69, including the selective delay of element 71, is an integer multiple of the slot time interval. This is possible due to the fact that two different timing signals (having the same frequency but independent phase) are used for writing and reading in the delay element, so that the selective delay can be a non-integer number of slot time intervals.

FIG. 6 illustrates the resulting situation for two selected stations i and j. Again, the contents of the two request queues i and j are different as usual. The number of counts stored in the delay elements i and j are also different, reflecting the different individual delay of each station. The total delay or propagation time from point 67 to point 69 of each station is the same (=b) for all stations.

Another feature of the disclosed system is as follows (it will be shown only in the detailed implementation described in the next section): A sequence of external request counts (no local request occurred between them) need not be kept separate in the FIFO request queue, because they must anyway be served consecutively (as seen locally) before the respective station gains access to a slot for a pending local request. Thus, when a sequence of consecutive external requests (as well as a sequence of consecutive local requests) is entered into the FIFO request queue where this sequence would occupy several consecutive queue positions, they can be accumulated into a single request count, thus occupying only a single position. This results in shorter request queues requiring less storage. However, it should be noted that the accumulation (adding up of several requests from different slots) must only be made after these counts leave the delay element, because otherwise the once initialized delay would not be maintained.

4) Implementation of Request Queue and Selective Delay Element in a Station

A block diagram of the combined implementation of all the features described above, is shown in FIGS. 7A and 7B for one station. The circuitry is connected between a Bus A (31) and a Bus B (33) of a folded bus system (as shown in FIG. 1B). Due to a signal conversion at each node (as will be described in connection with FIG. 11) the signals on each bus at the node/station interface may be different from the signals on the connecting bus sections (other physical signal, other coding) but the information is the same. Therefore, in FIG. 7 bus A and bus B carry reference numbers 31(X) and 33(X), respectively.

Two controllers (FIGS. 7A and 7B) are connected to the two busses and to the other circuitry for controlling operation of the FIFO request queue circuitry. Bus A Controller 81 receives all signals from bus A; it is shown in more detail in FIG. 8. Bus B Controller 83 receives all signals from bus B; it is shown in more detail in FIG. 9.

A FIFO request queue storage 41, and a delay element 71 which is also implemented as a FIFO storage, are provided as already shown in FIG. 5. Delay element 71 has e.g. 2048 positions each for holding an eight-bit request count value. FIFO request queue storage 41 has also 2048 positions, each for holding a 16-bit request count value. The request queue storage positions have a larger size than those of the delay element because count values from the delay element may be combined by addition before being entered into the request queue 41.

Queue Management 85 is connected to the FIFO request queue 41 for controlling its operation, and Delay Management 87 is connected to the delay element 71 for controlling its operation. Between the request queue FIFO and the delay element FIFO, there is provided an accumulator/ALU unit 89 (ACCU/ALU) with accumulator/ALU controller 90, for combining request counts read from delay element 71 before entering them into request queue 41. At the input of delay element 71 there is an input register 91. At the exit of the FIFO request queue 41, there is a 16-bit decrementer 93 which can hold one request count received from the request queue, and can decrease the current value by one unit when a respective control signal occurs.

Each of the positions of request queue FIFO 41 and of delay element FIFO 71, and also the input register 91 and the decrementer 93 have one extra bit position (41A, 71A, 91A, 93A) for holding one tag bit indicating whether the current contents in the respective position/register represents a local request count (LOC-TAG) or an external request count.

For transmitting data on bus A, a data segment buffer unit (DATA) 95 for holding a data segment waiting for transmission, and a data multiplexer 97 for overlaying data signals to the data stream on bus A are provided. Additional insert circuitry 99 in bus A allows to set the Busy/Free bit in a passing slot to "1" when data are to be inserted through the multiplexer 97.

The data segment buffer unit 95 preferably comprises two buffers, each of one data segment size, which are used alternatingly so that a segment can be read out to the bus from one of the twin buffers while the next segment (arriving from the station's higher layer) is inserted into the other one of the twin buffers.

It should be noted here that the segments transferred from the station to buffer unit 95 are just portions taken from a larger data packet to fit the buffer size and the slot segment size. They do not contain any count value or other housekeeping information to identify them separately. This is different from the segments usually provided in distributed queueing transmission systems; such segments must have some extra identifying information because they could be separated from the other segments of the same data packet, and thus must be reassembled at the destination by a special procedure using this extra information.

For transmitting a request count on bus B, a local request register 101 for holding one local request count (LOC-REQ) waiting for transmission, and a request multiplexer 103 for overlaying request count signals to the stream on bus B are provided.

A certain delay is required between the points where signals are copied from each bus, and the points where data signals are inserted on the bus, because some test must be made on the copied data before a decision is made whether waiting data (or a local request count) are actually inserted into the passing slot. To ensure this minimum delay of one word, a delay register 105 is provided in bus A, and a delay register 107 in bus B.

This is basically all the circuitry which is required in each station for holding the request queues and maintaining a delay, in accordance with the invention. Interconnecting data lines and control signal lines will be identified individually in the following description of the operation of this circuitry.

Operation of Request Queue and Delay Element:

a) Insertion of Request Counts: Bus B Controller 83 watches the data stream on bus B and tests each request field in a passing slot whether it contains a zero count or an actual request count value. It receives a B-clock signal on line 111 from front-end circuitry (signal converters, as will be shown in FIG. 11) to enable it to identify the fields in passing slots properly. If a zero count is detected (allowing insertion of a local request count into the passing ACF), then an Enable Multiplexer signal on line 113 is activated to enable the multiplexer 103 to insert the local request count waiting in register 101 via lines 115 into the passing ACF. Immediately thereafter, input register 91 is enabled by an Enable Register signal on line 117 to receive the contents of the passing request field, which now contains the just inserted local request count. Simultaneously, an active signal on line 119 (LOC-TAG) indicates that the count inserted into register 91 is a local request, thus establishing a local tag (LOC-TAG) with the entry in this register. Then, a credit signal is transferred on line 121 to the station main controller SMC giving it credit to send the next local request count into LOC-REQ register 101. When the SMC actually sends the next LOC-REQ on lines 123, it activates the signal on line 125 for enabling register 101 to receive the count and for notifying the Bus B Controller 83 that another local request is waiting for insertion.

If controller 83 detects that there is an actual external request count value in the request field of the passing ACF, then it does not activate the signals for local request insertion. However, the signal Enable Register on line 117 is activated each time a passing request field is seen, so that not only a transmitted local request count (as just described) is inserted into the input register, but also each external request count. However, the LOC-TAG will remain zero, thus indicating that the contents of register 91 is an external request. It is important (as will be explained later) that if the arriving (external) count is zero and no local request count is inserted (so that the request field in the passing slot remains empty), nevertheless a count is inserted into register 91, which will then be a zero count.

Bus B Controller 83 also furnishes a delay-in timing signal on line 127. This is a clock signal which is used by delay management 87, as will be explained later.

b) Insertion of Data: Bus A Controller 81 watches the data stream on bus A and tests the Busy/Free field in each passing slot. It receives an A clock signal on line 129 from front-end circuitry (signal converters, as will be shown in FIG. 11) to enable it to identify the fields in passing slots properly. If it detects a free slot indication, it will activate the Decrement signal on line 131 to decrease the contents of decrementer 93 by one unit because now a pending slot request can be served (be it by the own station or another station downstream).

If the request count in decrementer 93 represents a local request, the tag in position 93A will be "1" and an indication (LOC-TAG) will be given on line 133 to the controller 81. Waiting local data can then be inserted into the passing slot. A Set Busy signal is activated on line 135 so that insert circuitry 99 converts the bit in the passing Busy/Free field. An Enable Multiplexer signal on line 137 is activated to enable multiplexer 97 to insert the local data segment waiting in data segment buffer unit 95, via lines 139 into the data segment field of the slot passing on bus A. Then, a Send Data signal on line 141 to the SMC is activated to give the SMC credit for sending another data segment. The SCM then sends the next data segment on lines 143.

As was already mentioned above, the data segment buffer unit 95 preferably includes twin buffers for alternating usage, to enable simultaneous reading of one and insertion of another data segment. As such twin buffer operation is well known, it need not to be described here in more detail.

Bus A Controller 81 also furnishes a delay-out timing signal on line 145. This is a clock signal which is used by delay management 87, as will be explained later.

c) Transfer of Request Counts Through Delay and Queue: Queue management 85 and delay management 87 control the writing of request counts into and the reading of request counts out of their respective associated FIFO storage. They keep pointers which indicate the current top position and the current bottom position in the respective FIFO storage.

A count is read into delay FIFO 71 from input register 91 for each passing slot on bus B, under control of the delay-in timing signal from controller 83. The tag in field 91A is also transferred to the delay FIFO. A request count is read from the top of delay FIFO 71 via data lines 146 into the ACCU/ALU unit 89 for each passing slot on bus A, under control of the delay-out timing signal from controller 81. The LOC-TAG is also transferred via line 147 to the ACCU/ALU unit 89 and to its controller 90. Controller 90 is notified by a signal on lines 148 of each transfer of a request count into ACCU/ALU unit 89.

The ACCU/ALU unit operates as follows: As long as the LOC-TAG value stays the same (e.g. as long as it is zero indicating external request counts), the ACCU/ALU unit adds the newly transferred count value to the accumulated value it already keeps in an accumulator register. As soon as the LOC-TAG value changes (e.g., if after a sequence of external request counts, a local request count with LOC-TAG = 1 is transferred from the delay FIFO to the ACCU/ALU unit), then the contents of the accumulator register is transferred through lines 149 into the FIFO request queue 41 as a single count, together with a respective LOC-TAG value. The queue management 85 is notified of the transfer by a control signal on lines 150, to insert the accumulated count value into its bottom position. The request count value just transferred from the delay FIFO 71 into ACCU/ALU unit 89 is kept there in the accumulator register.

Thus, consecutive request counts of the same kind (external or local) contained in the delay FIFO are combined to form a single request count value for the FIFO request queue, but the two kinds are still well distinguished in the FIFO request queue despite the combination.

Whenever the count contained in decrementer 93 reaches the value zero, a respective signal is activated on line 151, notifying the queue management that now the next request count value from the top position of the queue must be transferred into the decrementer 93 (together with its tag).

To avoid complete emptying of the FIFO request queue 41, the accumulation of request counts could be intermediately suspended in the following way: A threshold is stored in the queue management 85, indicating the minimum number of FIFO locations which should contain request counts. The queue management then constantly watches the number of filled FIFO locations (difference between input and output pointers) and compares it to the threshold. If this number falls below the threshold, a respective control signal (suspend accumulation) is sent via lines 150 to the ACCU/ALU controller 90 which thereafter no longer accumulates counts but transfers them individually as received from the delay unit 71. When the queue management detects that the number of filled request queue FIFO locations is again above the set threshold, then it sends another control signal (resume accumulation) to ACCU/ALU controller 90 which from then on again accumulates the request counts as described above.

d) Initialization of Delay: At the beginning of system operation, or when an automatic restart is necessary after a system failure, all bus controllers have stopped their delay-in and delay-out timing signals on lines 127 and 147, and the delay FIFOs (71) are reset. As already briefly explained in section 3, the headend station then releases two delay initialization markers, M1 and M2. The headend station continuously generates slots, and inserts the two markers in the ACFs of two slots which have a particular time distance (=b time slots) from each other. When the first marker M1 arrives at Bus B Controller 83 in a station, the controller starts furnishing the delay-in timing signal on line 127. Thus, from that time on request counts are written into the delay FIFO 71 (all having a value of zero). During this initialization time, no counts are read out from the delay FIFO, i.e. the delay-out signal is still inactive. As soon as the second marker M2 arrives at Bus A Controller 81, it starts furnishing the delay-out timing signal on line 145. In the meantime, a number of request counts have accumulated in the delay FIFO 71. This number will then remain constant during operation and determines the station's individual delay which compensates any propagation differences, as explained in section 3.

5) Details of Bus FIFO Controllers

Some details of the two controllers 81 and 83 will now be described with reference to FIGS. 8 and 9.

FIG. 8 is a block diagram of the essential portions of the Bus A Controller (81). It comprises means 153 for extracting from the data stream it receives from bus A, and under control of the clock signal (129) derived from the signals on bus A, the Access Control Field ACF of each passing slot and for transferring certain subfields to a marker M2 detector 154 and a Busy/Free detector 155. A Delay Set latch 157 is reset at each system start or restart. When a marker M2 is detected, latch 157 is set by a signal on line 159 and then enables by its output signal on line 161 a gate 163, for transferring the A-clock signal from line 129 to the delay-out timing signal line 145.

When the Busy/Free detector 155 detects a zero in the B/F subfield of a passing ACF, then it activates at its output a control signal indicating that a free slot arrived which signal is transferred as Decrement signal over line 131 to decrementer 93. If the count in the decrementer represents a local request, as indicated by an active signal on LOC-TAG line 133, an AND gate 165 transfers the Slot Free signal on line 131 as Set Busy signal on line 135 for occupying the passing slot for a local data transfer. With a certain delay introduced by delay element 167, the output signal of AND gate 165 activates the Enable Multiplexer signal on line 137 for actually inserting the data into the passing slot, and the Send Data signal on line 141 for allowing the transfer of another local data segment.

FIG. 9 is a block diagram of the essential portions of the Bus B Controller (83). It comprises means 173 for extracting from the data stream it receives from bus B, and under control of the clock signal (111) derived from the signals on bus B, the Access Control Field ACF of each passing slot and for transferring certain subfields to a marker M1 detector 175, a Request Field detector 177, and a Request Count=0 (RQ=0) detector 179. A Delay Set latch 181 is reset at each system start or restart. When a marker M1 is detected, latch 181 is set by a signal on line 183 and then enables by its output signal on line 185 a gate 187, for transferring the B-clock signal from line 111 to the delay-in timing signal line 127.

A Request Waiting latch 189 is reset at each system start, and when the controller sends a credit for a new request count by a signal on line 121. Data Waiting latch 189 is set by the New Request notification signal on line 125 when the SMC transfers a new local request count into the local reques register 101. When the RQ=0 detector 179 detects a zero in the request subfield of a passing ACF, then it activates at its output a control signal which is transferred to one input of an AND gate 191. If simultaneously the output signal of latch 189 on line 193 indicates that a local request is waiting for transmission, then the output signal of AND gate 191 activates on line 113 the Enable Multiplexer signal for multiplexer 103 to actually insert the waiting local request count into the request subfield of the passing slot. With a certain delay introduced by a delay element 195, the output signal of AND gate 191 activates the local tag (LOC-TAG) signal on line 119 for inserting the local tag into the tag portion 91A of input register 91, and the Credit signal on line 121 for allowing the transfer of another local request from the SMC. This signal also resets the Request Waiting latch.

Whenever a request field is detected on bus B (be its contents zero or not), detector 177 activates on its output a respective control signal which is delayed by a delay element 197, and then transferred as Enable Register signal on line 117 to the input register 91 for enabling it to copy the request count from the slot which passes by on bus B.

6) Representation of Initialization Markers

As was described above, the headend station must insert two different markers into the ACF field of slots when the individual delay of the request queue in each station is to be initialized. The Reserved subfield (shown in the ACF format in FIG. 2C) can be used for representing the markers M1 and M2. Below are shown examples for the marker representation.

| R1 | R2 | R3 | R4 | |
|---|---|---|---|---|
| (A) | | | | |
| 1 | 0 | X | X | = M1 |
| 1 | 1 | X | X | = M2 |
| 0 | X | X | X | = other |
| (B) | | | | |
| 1 | 0 | 0 | X | = M1 (original) |
| 1 | 0 | 1 | X | = M1 (returning) |
| 1 | 1 | X | X | = M2 |

| R1 | R2 | R3 | R4 | |
|---|---|---|---|---|
| -continued | | | | |
| 0 | X | X | X | = other |

For the folded bus system (FIG. 1B) which was used as the example for above described embodiment, the respective representation is shown at (A). The four bits of the Reserved subfield are designated as R1, R2, R3, and R4. To indicate the presence of a marker, R1 is set to 1. The two markers are distinguished by bit R2. The remaining two bits R3 and R4 are still available for other purposes. As was described above, marker M1 is used on bus B whereto it automatically propagates in a folded bus system. Marker M2 is only used on bus A.

For a dual bus system as shown in FIG. 1A, the situation is slightly different because usually slots propagate only along one bus and do not return on the other bus. Therefore, a modification is necessary to allow the M1 markers when they have reached the end of one bus, to be further propagated on the other bus. An additional representation is required to distinguish an M1 marker on its original bus from an M1 marker returning on the other bus. The third reserved bit R3 is used for this purpose. The representation is shown above at (B).

7) Modification in Headend Stations of Dual Bus System for Delay Initialization

As indicated above, the M1 markers must be wrapped around to the other bus in a dual bus system which requires some modification in the headend stations. This is shown in FIG. 10 (which is the modified form of the dual bus network shown in FIG. 1A). The headend station 15 for bus A (HE-A) comprises as usual a generator/sender 201 which generates the slots and inserts some information into the ACF field when transmitting them. Also, headend station HE-B (17) comprises such generator/sender 203 for slots. Headend station HE-A generates for initialization, markers M1(A) and M2(A). The first one propagates along bus A but must also propagate along bus B because it has to be detected there. Therefore, bus section 21 (which could be omitted in a normal dual bus system) must be included so that each slot of bus A can propagate through to headend station HE-B. An extra receiver 205 is provided in HE-B which receives the slots and can detect the presence of an original marker M1 in an ACF. If it detects one, it sends a control signal on line 207 to slot generator/sender 203, which then inserts a returning marker M1' into the next slot it issues on bus B. This marker can then be recognized by all stations to start their delay-in timing signal.

In headend station HE-A, there is also provided an additional receiver 209 (receiving the slots from bus B on section 23), and a control signal line 211. Thus, also headend station HE-A can recognize an original M1 marker (in this case one that was issued be headend HE-B), and cause its generator/sender 201 to insert a returning marker M1' into a slot propagating along its bus A. The receivers (205, 209) in both headend stations ignore returning M1' markers, as well as M2 markers; thus, a returning marker M1' propagates only once along the counter-bus, and a marker M2 propagates only once along its original bus.

8) Duplication for Dual Bus Network

In a dual bus network as shown in FIG. 1A, there are actually two independent request and access arrangements: Request for data transmission access on bus A are inserted and propagated on bus B, and requests for data transmission access on bus B are inserted and propagated on bus A. While the circuitry shown and described above was designed for a folded bus system in which requests are only inserted and transmitted on the inbound bus, it is clear (and was already mentioned) that the invented access technique can also be used in dual bus systems, but all the circuitry (request queue FIFO and delay FIFO) must then be duplicated.

9) Signal Conversion between Busses and Stations

FIG. 11 is a schematic representation of the front-end circuitry which provides signal conversion and appropriate code conversion between system busses and station circuitry. Typically, information could be transferred on the busses (31, 33) between stations in the form of bit-serial optical signals. Within station circuitry, information would be represented as electrical signals in word-parallel form.

Incoming bus A (31) is connected to Bus A Front-End Receiver 215 (including an optical/electrical signal converter) which furnishes on its parallel output bus lines 31(X) the data, and on a clock line 129 the regenerated A-clock signal, both in electrical form, to the station's bus access circuitry 217. Data generated in the station to be further propagated on the bus are furnished on parallel bus lines 31(X) to Bus A Front-End Transmitter 219 (including an electrical/optical signal converter) which transmits them in converted form as optical serial signal on outgoing bus A (31).

Similarly, bus B (33) is connected through Bus B Front-End Receiver 221 (including an optical/electrical signal converter) and through Bus B Front-End Transmitter 223 (including an electrical/optical signal converter) to the station's bus access circuitry 217. A B-clock signal as derived by front-end receiver 221 from data on bus B is furnished on line 111.

The station's other equipment (higher layer) including the Station Main Controller SMC, all indicated as one block 225 in FIG. 11, is connected to the bus access circuitry 217 by several data and control lines for the exchange of data and control signals.

Those portions of bus access circuitry 217 which are essential for present invention were shown in FIGS. 7, 8, and 9 and explained in the respective text. It should be noted that bus access circuitry, besides receiving and transmitting access requests on bus B, and transmitting data on bus A (all explained with reference to FIGS. 7, 8, 9) also receives data from bus B which are directed (addressed) to the station. However, data reception is not relevant for the invention and therefore not shown here in detail.

10) Arrangement for Multiple Priorities

The circuitry shown in the above description will handle all requests for one priority class. If no different priorities are provided, this is sufficient for the operation. However, if multiple priorities are introduced as was mentioned in section 1 with the description of FIG. 2A-2D (slot format and ACF format), i.e. if separate requests have to be made for the various priorities and separate slots are issued, the request queue with selective delay and associated circuitry have to be provided as many times as there are priority classes. Thus, when four classes are introduced, each station must have four request queue FIFO stores.

The delay element FIFO could also be provided in multiple form, one for each priority. However, a single shared delay element FIFO would be sufficient if each entry is amended by a priority tag (two bits for four priorities). At the delay element output, a demultiplexer must then be provided for distributing the request counts read from the delay element FIFO into the multiple request queues (e.g. four request queues) according to the priority tag.

What is claimed is:

1. Method of regulating access to a communication system, said system comprising two counterflowing transmission busses and a plurality of stations connected between them, sequential time slots being generated by a headend station on a first one of said busses for transmission of data, each station transmitting on the respective second one of said busses access requests for slots, and each station determining its right to transmit data in a slot on the first bus on the basis of external access requests detected from other stations and own local access requests;

said method comprising the following steps to be executed in each station:

maintaining an access request queue (41) of said external and local access requests reflecting their sequence of occurrence; and providing a station-individual delay (71) for access requests to be entered into said access request queue, to compensate for propagation time differences existing for time slots and access requests with respect to the different stations of the system.

2. Method in accordance with claim 1, further comprising the steps of:

storing said access requests as integer numbers each representing either an external request count or a local request count, sequentially in the access request queue (41);

transferring the contents of the top position of said access request queue into a decrementing register (93);

decrementing the contents of said decrementing register for each empty slot detected on said first bus by the station; and when the contents of said decrementing register has reached the value zero, transferring the contents from the next position of said access request queue into the decrementing register.

3. Method in accordance with claim 1, further comprising the step of:

providing said station-individual delay by storing access requests, prior to entering them into said access request queue (41), in a FIFO delay storage (71) containing a preselected number of entries determining the amount of delay.

4. Method in accordance with claim 3, further comprising the steps of:

initializing the delay effected by said FIFO delay storage in each station, by transmitting on said first bus two initializing markers (M1, M2) which are separated by a preselected time interval (b);

starting, in any station when it detects the first marker on the second bus, a first timing signal (127) derived from slots on said second bus, for controlling writing of access requests into said FIFO delay storage, and entering one entry into said FIFO delay storage for each slot passing on said second bus, which entry either represents a request count contained in a slot or is equal to zero if a slot contains no access request; and starting, in any station when it detects the second marker on the first bus, a second timing signal (145)

derived from slots on said first bus, for controlling the reading of one entry from said FIFO delay storage per slot on the first bus, to transfer it into said access request queue.

5. Method in accordance with claim 4, in a system which comprises two headend stations each for releasing time slots on one of the two counterflowing busses with said slots propagating only along the bus on which they are generated, comprising the following step:

using a headend station to transfer the first initialization marker (M1) which said headend station did not release when said first initialization marker has reached the end of the one bus on which it was released, in its original or in a modified form to the other bus so that it can propagate along that other bus.

6. Method in accordance with claim 3, further comprising the following step:

accumulating (89, 90) consecutive external access requests which are read from said FIFO delay storage, and entering them as a single access request count into said access request queue.

7. Method in accordance with claim 1, in a system providing a plurality of priorities for requesting access to slots, comprising the steps of:

generating each of said time slots with a priority indication;

inserting an access request for a given priority only into a slot carrying the respective priority indication; and providing a separate access request queue for each of said priorities, for receiving external access requests and local access requests of the respective priority.

8. Method in accordance with claim 1, further comprising the steps of:

transmitting a local access request by inserting it into a slot on the second one of said busses, and copying each access request detected in a passing slot on said second bus, including any local access request just transmitted by the respective station, for insertion into the access request queue of the respective station.

9. Method of regulating access to a communication network, said network comprising two unidirectional counterflowing transmission busses, a plurality of stations each connected to both busses, and at least one headend station for generating time slots propagating on said busses, each slot comprising an access control field (ACF) and a data segment field; in which method each station requests slot access by inserting an access request into a request subfield of the access control field in a passing slot, and determines its right to access a slot for data transmission on the basis of the access requests it has detected from other stations in passing slots; said method comprising the following steps to be executed in each station;

maintaining a record of local access requests (LOC-REQ) generated by the respective station and of external access requests (EXT-REQ) seen from other stations, in the form of a FIFO request queue (41), said record reflecting the sequential order of occurrence of said access requests;

inserting a request count for each local access request for one or multiple slots into the empty request subfield of a passing slot, and thereafter inserting a respective local request count into the FIFO request queue; and monitoring the contents of the request subfield in each passing slot, and copying any external access request and forwarding it as external request count for insertion into the FIFO request queue.

10. Method in accordance with claim 9, further comprising the steps of:

decrementing the access request count in the top position of the request queue in each station when it detects a free slot at its input to remove one specific slot request; and introducing initially a station-individual delay (71) at each FIFO request queue such that when a specific slot request is about to be removed from the request queue in a station, the respective station detects passing at its input the same specific slot which was detected or will be detected by any other station at its input when the same specific slot request is about to be removed from the request queue in that other station.

11. Method in accordance with claim 10, further comprising the step of:

providing said station-individual delay by storing access requests, prior to entering them into said FIFO request queue, in a FIFO delay storage (71) containing a preselected number of entries determining the amount of delay.

12. Method in accordance with claim 11, further comprising the steps of:

initializing the delay effected by said FIFO delay storage, in each station, by transmitting on a first one of said busses two initializing markers (M1, M2) which are separated by a preselected time interval (b);

starting, in any station when it detects the first marker on the respective second one of said busses, a first timing signal (127) derived from slots on said second bus, for controlling writing of request counts into said FIFO delay storage, and entering one entry into said FIFO delay storage for each slot passing on said second bus, which entry either represents a request count contained in a slot or is equal to zero if a slot contains no access request; and starting, in any station when it detects the second marker on the first bus, a second timing signal (145) derived from slots on said first bus, for controlling the reading of one entry from said FIFO delay storage per slot on the first bus, to transfer it into said FIFO request queue.

13. Method in accordance with claim 10, further comprising the following steps:

accumulating (89, 90) external access requests which are read consecutively from said FIFO delay storage without an intervening local access request, prior to entering them into said FIFO request queue, and also accumulating local access requests which are read from said FIFO delay storage without an intervening external access request, prior to entering them into said FIFO request queue.

14. In a communication network comprising two unidirectional counterflowing transmission busses, a plurality of stations each connected to both busses, and at least one headend station for generating time slots on one of said busses; in which network each station requests slot access by inserting an access request into a passing slot, keeps a record of pending access requests, and determines its right to access a free slot for data transmission on the basis of external access requests it has detected from other stations in passing slots;

distributed queue multiple access apparatus in each station comprising:

request queue storage means (41, 85) for storing in sequential order request count values representing external access requests (EXT-REQ) and local access requests (LOC-REQ), respectively; and delay means (71, 87) connected in series with said request queue storage means, for providing, individually for the respective station, a selective delay for request count values being entered into said request queue storage means, for compensating propagation delay differences which exist for slots with respect to the different stations.

15. Apparatus in accordance with claim 14, in which said request queue storage means is a FIFO storage (41, 85) from which always the oldest stored request count value is read out first.

16. Apparatus in accordance with claim 14, further comprising decrementing means (93) for receiving a request count value read from said request queue storage means (41, 85) and for decrementing its contents by one unit upon occurrence of a respective control signal (131) issued by a bus controller (81) which detects empty slots and for furnishing another control signal (151) to said request queue storage means when the contents of said decrementing means has become zero, to initiate the transfer of another request count value.

17. Apparatus in accordance with claim 14, in which said delay means includes a FIFO storage (71, 87) from which always the oldest stored request count value is read out first.

18. Apparatus in accordance with claim 17, further comprising means (111, 175, 181, 183, 185, 187) for deriving a first timing signal (127) for controlling the writing of request count values into said FIFO storage (71), from the slots on one (B) of said two busses, and means (129, 154, 157, 159, 161, 163) for deriving a second timing signal (145) for controlling the reading of request count values out of said FIFO storage (71), from the slots on the other one (A) of said two busses, such that the writing into and reading from said FIFO storage (71) occurs at the pace of the slots on the respective busses.

19. Apparatus in accordance with claim 14 or 18, further comprising initialization means for initializing the delay of said delay means (71, 87) in response to two different initialization markers (M1, M2) which are transmitted by said headend station with a given time distance between them; said initialization means including means (111, 175, 181, 183, 185, 187) for detecting on one (B) of said busses a first one of said markers (M1, M1') and for starting, upon detection of said first marker, a first timing signal (127) for writing request count values into said delay means (71, 87), and means (129, 154, 157, 159, 161, 163) for detecting on the other one (A) of said busses the second one of said markers (M2) and for starting, upon detection of said second marker, a second timing signal (147) for reading request count values from said delay means for insertion into said request queue storage means (41, 85).

20. Apparatus in accordance with claim 14, further comprising means (89,90) for accumulating by addition, sequential external request count values on one hand and sequential local request count values on the other hand, which were read from said delay means (71, 87), prior to entering them into said request queue storage means (41, 85).

21. Apparatus in accordance with claim 14, for a system in which plural priority categories are provided for access requests; the apparatus comprising as many parallel request queue storage means and associated circuitry, as the system has priority categories, so that access requests can be stored and handled separately for each one of the priority categories.

22. Apparatus in accordance with claim 14, further comprising means (103, 113, 115; 91, 117, 119) for inserting a local request count value into a passing slot on one of said busses (B), and for inserting the same local request count value into the delay means (71, 87) of the request queue storage means (41, 85) after said local request count value was inserted into a passing slot on said one bus.

23. In a communication system comprising two unidirectional counterflowing transmission busses, at least one headend station for generating time slots on one of said two busses and a plurality of user stations, each one connected between the two busses, an apparatus for providing access to the busses comprising:

a request queue storage means in each station for storing in sequential order request count values representative of external access requests (EX-REQ) and local access requests (LOC-REQ), respectively;

first means in each station for receiving and examining an access request field (ACF) in an ACF section of each passing slot and for issuing a control signal if the access request field has a zero value;

second means responsive to the control signal to insert a local access request (LOC-REQ) value in the access request field and in the bottom of the request queue storage means; and third means for copying external access request (EX-REQ) values from the access request field and inserting said external access request values in the bottom of the request queue storage means.

* * * * *